June 2, 1970  A. B. HARBAGE, JR  3,515,449
SOFT RUBBER SQUEEZE FILM BEARING
Filed Sept. 10, 1968
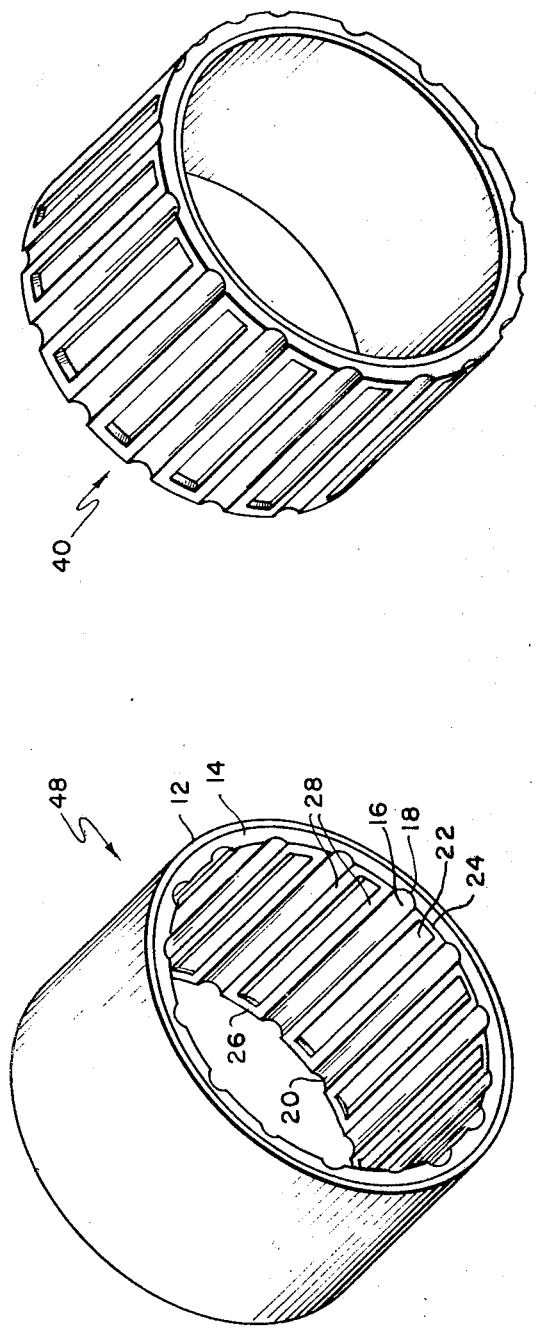
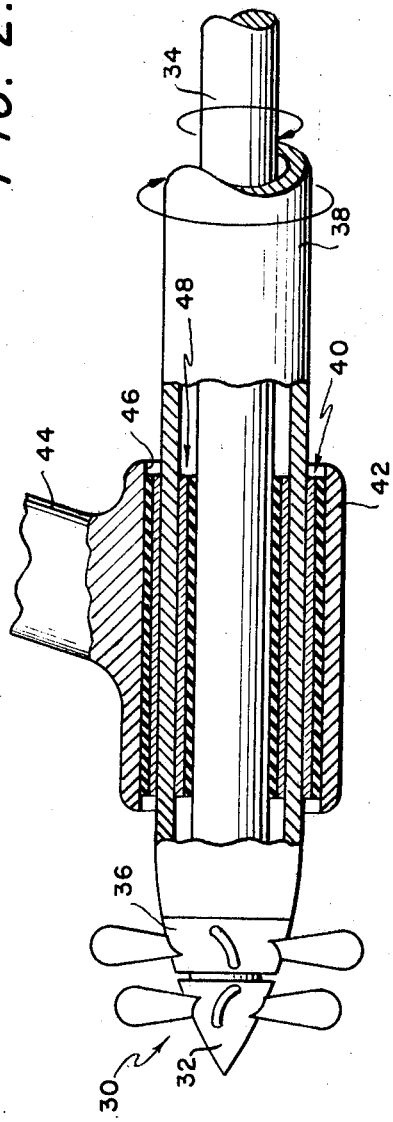
INVENTOR
ALFRED B. HARBAGE, Jr.
BY

United States Patent Office 3,515,449
Patented June 2, 1970

3,515,449
SOFT RUBBER SQUEEZE FILM BEARING
Alfred B. Harbage, Jr., Severna Park, Md., assignor to the United States of America as represented by the Secretary of the Navy
Filed Sept. 10, 1968, Ser. No. 758,868
Int. Cl. F16c 27/00
U.S. Cl. 308—238        7 Claims

ABSTRACT OF THE DISCLOSURE

A soft rubber bearing particularly for propeller shafts and applications wherein the bearings will be lubricated by the environmental fluid and wherein the bearing surface comprises pockets formed in the soft rubber which are completely filled with water when the pocket is non-bearing. When the bearing and thereby some of the filled pockets are rotated to a bearing position, the non-compressibility of the water supports the shaft and squeezes past the wall of the pocket to thereby lubricate the ruber lands or ends which would otherwise be in contact with the shaft.

---

The invention described herein may be manufactured and used by or for the Government of the United States of America for governmental purposes without the payment of any royalties thereon or therefor.

BACKGROUND AND SUMMARY OF THE INVENTION

This invention relates generally to water lubricated bearings and in particular to propeller shaft bearings of soft rubber composition which trap water in pockets formed in the molded rubber. Water is so trapped in the pockets and due to its non-compressibility provides support for the shaft and a film of water between the shaft and the lands, which constitutes the walls of the pockets or webs to thereby greatly reduce friction. This reduction in friction may be by as much as 80% over prior art bearings. The bearing of the instant invention, in contradistinction to prior art bearings, is rotated so as to fill the pockets with water when in a non-bearing position or when it is above the shaft, and carries this water in the pockets to a lower or bearing position to thence support the shaft. The shaft and the rubber lands of the bearing therefore do not come into direct contact, a condition which would otherwise increase friction and wear on the bearing.

Soft rubber, water-lubricated bearings of the type with which this invention is concerned, are of generally two types. One is the so-called full molded type wherein the rubber bearing material is formed and bonded inside of a suitable metal shell. The rubber is molded into a shape such as to provide a series of longitudinal bearing faces having a generally convex cross-section with grooves running through the entire length of the bearing. The convex rounded edge profile of the lands is an attempt to provide a fluid wedge and to avoid the wiping off of water lubricant during rotation of the shaft. The water grooves in-between provide for water flow to feed the bearing with lubricant and for flushing purposes.

The other type of multi-face rubber bearing is that of segmented construction comprising a plurality of staves which may be attached to the periphery of a shaft or its journal, i.e. parallel to the axis of rotation, and placed at equi-angular points about said periphery. These staves have a cross-sectional shape similar to the lands of the full molded type bearing to provide for similar features.

Accordingly, it is the principal object of this invention to provide a soft rubber water lubricated bearing of high anti-frictional efficiency that is not susceptible to burning out.

Another object of this invention is to provide a soft rubber water lubricated bearing having pockets formed therein for containing water for supporting the shaft.

Still another object of this invention is to provide a soft rubber water lubricated bearing capable of high speed operation which, in its operation, is rotatable to pick up water for lubrication when in a non-bearing position, said picked up water being operable to support the shaft when in a bearing position.

Other objects and features of the invention will become apparent to those skilled in the art upon reference to the accompanying specification, claims and drawings.

BRIEF DESCRIPTION OF THE DRAWINGS

FIG. 1 is a perspective view of a soft rubber water lubricated bearing having internal bearing surfaces.

FIG. 2 is a perspective view of a soft rubber water lubricated bearing with an external bearing surface.

FIG. 3 is a cross sectional view of a counter-rotating propeller shaft system having the internal bearing and the external bearing attached to the outer propeller shaft too.

DESCRIPTION OF THE PREFERRED EMBODIMENT

Referring now to FIGS. 1 and 2, wherein like reference numerals designate corresponding parts, there is shown soft rubber water lubricated bearings 40 and 48 according to the invention. The bearing comprises a suitable metallic shell 12 onto which a molded soft rubber bearing material 14 is bonded either to the inside or the outside of the metallic shell 12, as shown in FIG. 1 and FIG. 2, respectively. The standard internal bearing type will be described.

The exposed surface of the bearing material 14 is molded in a rather intricate shape. Longitudinal grooves of concave semi-circular cross-section 16 are formed. The grooves 16 are open at their ends 18 and 20 and will provide a straight through passage when a shaft fitting the minor diameter of the bearing is inserted. Adjacent groove 16 there are molded or otherwise formed in the surface of the soft rubber a plurality of pockets 22 having walls 24 and 26 at either end of their lengths. Upstanding webs 28 interposed between the pockets 22 and the grooves 16 complete the periphery of the pockets 22. As can be seen in FIGS. 1 and 2, grooves 16 and pockets 22 alternate throughout the circumference of the bearing. In contradistinction to the function of grooves 16, no flow will occur through the pockets 22 due to their upstanding end pieces 24 and 26, when a shaft is inserted in and fits the minor diameter of the bearing.

Referring now to FIG. 3, there is shown a counter-rotating propeller assembly 30. An after propeller 32 is attached to the inner shaft 34 which is connected to drive means (not shown). The inner propeller 36 is shown here as having a larger disc diameter and is attached to the outer tubular shaft 38 which is also attached to drive means (not shown). As indicated by the arrows on the inner and outer shafts, they rotate in a direction counter to each other.

The outer diameter of outer tubular shaft 38 is fitted with an external type soft rubber water lubricated bearing 40. The external bearing 40 has an inner shell 12 onto which the soft rubber bearing material 14 is bonded. The fit between the shaft 38 and the sleeve 12 is such that the bearing rotates with the shaft. The strut bearing boss 42 is attached to a strut 44 and is bored to form a smooth bearing surface 46 which the external bearing 40 contacts and within which it rotates.

The internal diameter of the outer tubular shaft is fitted with an internal type bearing 48 (shown in FIG. 1), the fit being sufficient to cause bearing 48 to rotate with the shaft 38. The bearing 48 has an external metal sleeve 12 fitting the inner diameter of the outer shaft 38 and has a soft rubber bearing material 14 molded therein. The inner diameter of the bearing 48 contacts the inner shaft 34 for a relative frictionless rotation.

DESCRIPTION OF THE OPERATION

A better understanding of the operation of this novel type soft rubber water-lubricated bearing will be better understood with reference to the following. Of primary importance with this type of bearing is that the bearing be rotated, and it is therefore attached to a rotating element of the bearing assembly such as the outer shaft 38 in the case of the use of this bearing in counter-rotating shaft applications. In the case of counter-rotating shaft is is necessary to separate the inner shaft 34 from the outer shaft 38 with bearing 48, and the outer shaft 38 from the strut bore 42 by bearing 40. These bearings 40 and 48 therefore rotate as required.

In discussing the operation of these bearings, it is considered that in horizontal shaft applications such shafts have a mass which is pulled by gravitation in a downward direction and therefore are in a bearing condition on the downward portion of the arc of rotation, and compress somewhat the soft rubber bearings 40 and 48. In the upper portion of the arc of rotation the bearings are relatively unloaded. In propeller shaft applications, the propellers and their shafts, as well as the bearings, are completely immersed in the buoyant fluid. The bearings 40 and 48 are freely accessible to this fluid. The fluid, which may be water, will therefore enter the throu grooves 16 around the periphery of the bearings. At the top portion of the arc of rotation, water will also enter pockets 22 because the fit of the bearings is chosen so that in the upper portion of the arc the upstanding webs 24 and 28 will not be in direct contact with the inner shaft 34 and the inner diameter 46 of the strut boss 42.

Water filling these pockets 22 is carried by the rotation of the outer shaft 32 in the lower portion of the arc of rotation wherein the upstanding webs 24, 26 and 28 will, under the load of the shaft, tend to make contact with shaft 34 and the inner diameter 46. The term "tend to make contact" is used to denote the fact that the weight of the shafts will be borne by the water trapped in the pockets 22 and because of the water's non-compressibility will be squeezed out over the top of the upstanding webs 24, 26 and 28 so that the shafts will not in fact contact the soft rubber upstanding webs. The shafts therefore ride on the incompressible water which is contained within the pockets 22 and on the fluid wedge produced as the water is squeezed out of the pockets into the space between the shaft and the upstanding webs 24, 26 and 28.

It is to be understood that the invention is not limited to the exact details of the construction shown and described for obvious modifications will occur to persons skilled in the art.

What is claimed is:

1. A soft rubber water lubricated bearing of essentially open tubular configuration having longitudinal coaxial concave grooves equally spaced about the periphery thereof the improvement comprising:

a plurality of pockets separating each of said coaxial grooves, said pockets being formed with upstanding webs between each pocket and its adjacent grooves, and said pockets having two upstanding webs at the ends of the bearing so as to complete the periphery of said pockets whereby said pockets are thus interspersed between each of said grooves and lying parallel therewith.

2. The soft rubber water lubricated bearing of claim 1 wherein said pockets are further described:

an upstanding web forming a substantially rectangular periphery of said pocket.

3. The soft rubber water lubricated bearing of claim 1 wherein said pockets are further described by:

a closed void when said bearing is in contact with a mating shaft.

4. The soft rubber water lubricated bearing of claim 1 of internal construction for surrounding a shaft.

5. A soft rubber water lubricated bearing of claim 1 wherein said bearing is of external construction for contacting the internal diameter of a tubular shaft.

6. A soft rubber water lubricated bearing of claim 1 wherein said bearing rotates so as to fill said pockets with water when in a non-bearing condition and due to non-compressibility support the major weight of a shaft when in the bearing position.

7. A counter-rotating shaft assembly utilizing soft rubber water lubricated anti-friction bearings and mounted in a bearing boss comprising:

a center shaft;

an outer tubular shaft concentric and surrounding said center shaft;

an internal bearing attached for rotation with said tubular shaft for substantially frictionless support of said center shaft; and an external bearing attached for rotation with said tubular shaft for substantially frictionless support of said tubular shaft in said bearing boss;

said internal and external bearings each being of essentially open tubular configuration having longitudinal coaxial concave grooves equally spaced about the periphery thereof and containing a plurality of pockets separating each of said coaxial grooves, said pockets being formed with upstanding webs between each pocket and its adjacent grooves and said pockets having two upstanding webs at the ends of the bearing so as to complete the periphery of said pockets whereby said pockets are thus interspersed between each of said grooves and lying parallel therewith.

References Cited

UNITED STATES PATENTS

| | | | |
|---|---|---|---|
| 2,405,799 | 8/1946 | Smeallie | 308—240 |
| 2,673,767 | 3/1954 | Schoeppner | 308—240 X |
| 3,167,361 | 1/1965 | Snapp | 308—238 X |

FOREIGN PATENTS

| | | |
|---|---|---|
| 1,499,497 | 10/1967 | France. |
| 625,487 | 6/1949 | Great Britain. |

MARTIN P. SCHWADRON, Primary Examiner

U.S. Cl. X.R.

308—240